United States Patent [19]
Smith

[11] 3,828,880
[45] Aug. 13, 1974

[54] VEHICLE POWER SYSTEM
[76] Inventor: William H. Smith, 532 W. Washington, Sullivan, Ind. 47882
[22] Filed: Aug. 27, 1973
[21] Appl. No.: 391,743

[52] U.S. Cl. ................... 180/66 R, 60/407, 60/412, 180/65 R
[51] Int. Cl. ............................................ B60k 3/04
[58] Field of Search .... 180/66 R, 66 A, 66 B, 65 R, 180/6.3; 60/407, 412, 325, 102

[56] References Cited
UNITED STATES PATENTS
| | | | |
|---|---|---|---|
| 2,530,281 | 11/1950 | Barsby | 60/102 |
| 2,571,179 | 10/1951 | Alexander | 60/325 |
| 3,379,008 | 4/1968 | Manganaro | 180/66 R |

*Primary Examiner*—Lloyd L. King
*Assistant Examiner*—Randolph A. Reese
*Attorney, Agent, or Firm*—Woodard, Weikart, Emhardt & Naughton

[57] ABSTRACT

A power system for propelling a vehicle. The vehicle includes a source of electrical energy connected to a motor which powers a liquid pump. The pump forces liquid from a central source through at least one nozzle which directs the pressurized liquid against concave fins of a turbine wheel. A generator for recharging the source of electrical energy includes a second turbine wheel with concave fins located adjacent the concave fins of the first turbine wheel to receive the pressurized liquid forced through the first turbine wheel fins. A sump pump returns the liquid to the central source.

9 Claims, 4 Drawing Figures

3,828,880

VEHICLE POWER SYSTEM

BACKGROUND OF THE INVENTION

1. Field of the Invention:

This invention is in the field of liquid power systems.

2. Description of the Prior Art:

A number of U.S. Patents have been issued which disclose various types of vehicles which have batteries for powering liquid driven turbines. Some of these vehicles include golf carts and loading vehicles. For example, in U.S. Pat. No. 3,424,260 issued to R. W. Stone, et al, a hydraulically operated golf cart is disclosed. A more sophisticated battery operated hydraulic propulsion system for a vehicle is disclosed in U.S. Pat. No. 3,213,604 issued to C. P. de Biasi. Likewise, U.S. Pat. No. 3,543,873 issued to W. W. Toy discloses a gas turbine connected to an electrical system for driving the vehicle. A hydraulically driven turbine for a vehicle wherein the power is provided by an internal combustion engine is disclosed in the U.S. Pat. No. 3,468,390 issued to J. C. Schultz.

Disclosed herein is yet another hydraulic power system for propelling a vehicle. My system has several advantages over the prior art systems. For example, one of the advantages is a feature for recharging the source of electrical energy by capturing the unexpended liquid thrust subsequent to the liquid impinging upon the main turbine fins and then impinging upon a generator turbine wheel. The main turbine wheel is of sufficient size and mass to provide a relatively large moment of inertia thereby forcing the pressurized liquid outwardly under centrifugal force thereby causing the pressurized liquid to impinge upon the fins of the generator turbine with a larger impact. An internal combustion engine is not used in the present system thereby providing for a pollution free system. The system disclosed herein is relatively uncomplicated thereby providing for low production costs and a low maintenance. A central turbine is used for powering the vehicle as constrasted to the prior art vehicles some of which use a number of smaller turbines each located at a separate vehicle wheel. By reducing the number of turbines required, the maintenance is thereby decreased.

SUMMARY OF THE INVENTION

One embodiment of the present invention is in a vehicle having at least one rotatable driver for propelling the vehicle, a source of electrical energy mounted on the vehicle, a motor mounted on the vehicle and operably connected to the source of electrical energy, a liquid pump mounted on the vehicle and operably connected to the motor, a liquid system mounted on the vehicle and including a source of liquid connected to the pump and a nozzle for the liquid to exit under force from the pump, a turbine including a housing mounted to the vehicle and a first multi-vane wheel rotatably mounted within the housing for receiving the liquid from the nozzle, wherein the improvement comprises means mounted to the vehicle including a second multi-vane wheel rotatably mounted in the housing and positioned to receive and be rotated by liquid exiting the first multi-vane wheel, the means operable upon rotation of the second multi-vane wheel to utilize unexpended thrust of the liquid to recharge the source of electrical energy.

It is an object of the present invention to provide a new and improved system for powering a vehicle.

A further object of the present invention is to provide a hydraulic power system for a vehicle which captures the unexpended liquid thrust for recharging the vehicle electrical system.

Related objects and advantages of the present invention will be apparent in the following description.

DESCRIPTION OF THE PREFERRED EMBODIMENT

Figure 1:
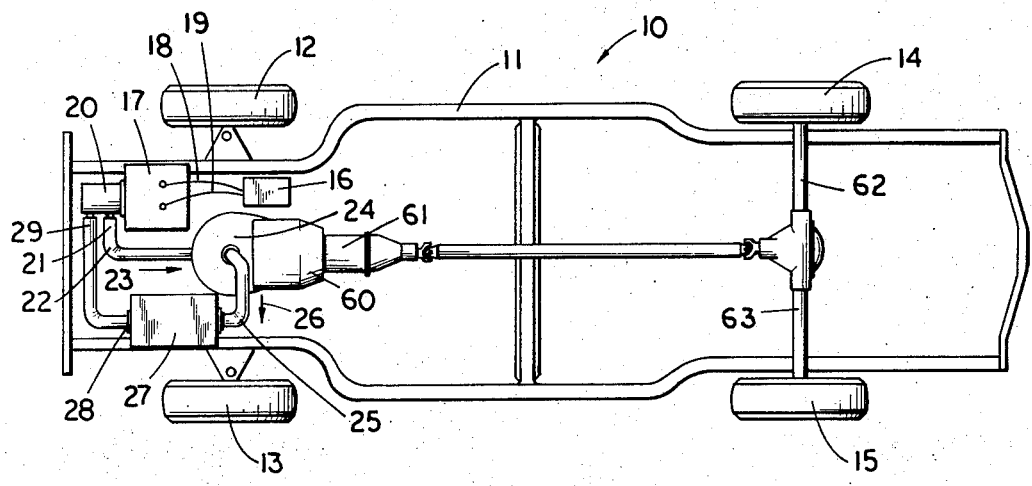
FIG. 1 is a bottom view of a vehicle incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a vehicle 10 including a main frame 11 upon which front wheels 12 and 13 are rotatably mounted. Likewise, a pair of rear wheels 14 and 15 are mounted to the frame. A source of electrical energy 16 is mounted at the front of the vehicle and may include, for example, a plurality of batteries connected together to produce the desired voltage and current. Motor 17 is also mounted at the front of the vehicle to the vehicle frame and is operably connected by wires 18 and 19 to the source of electrical energy 16. A liquid pump 20 is mounted to motor 17 and is driven by the output shaft of motor 17 not shown. Pump 20 has a liquid outlet 21 connected to conduit 22 for forcing pressurized liquid in the direction of arrow 23 toward main turbine housing 24. A second conduit 25 returns the pressurized liquid from turbine housing 24 in the direction of arrow 26 to a source of liquid 27 mounted at the front of the vehicle. The liquid is then forced from central source 27 via conduit 28 to the inlet 29 of pump 20 and then recirculated through the main turbine housing.

Turbine housing 24 (FIG. 2) has portion 30 removably connected to portion 31. Rotatably mounted within housing 24 is a main turbine wheel 32 which includes a supporting base 33 mounted to shaft 34 bearingly supported within portion 30 of the housing. A plurality of concave fins 35 are mounted to the circumferentially extending edge portion of supporting base 33. Each fin extends a fixed length above the supporting base. At least one nozzle is mounted to portion 30 of housing 24 for directing pressurized liquid from conduit 22 outwardly against fins 35. In the embodiment shown in the drawings, conduit 22 is connected via junction 36 to three conduits 37, 38 and 39. Each conduit 37 through 39 receives an equal amount of pressurized liquid from conduit 22. Each conduit 37 through 39 has a nozzle mounted to one end thereof to direct the pressurized liquid against the concave fins. For example, conduit 37 (FIG. 2) is mounted to nozzle 40 fixedly mounted to portion 30 of housing 24. The bottom end 41 of nozzle 40 is positioned inwardly of concave fin 35 to direct the pressurized liquid outwardly through the concave fin.

Figure 2:
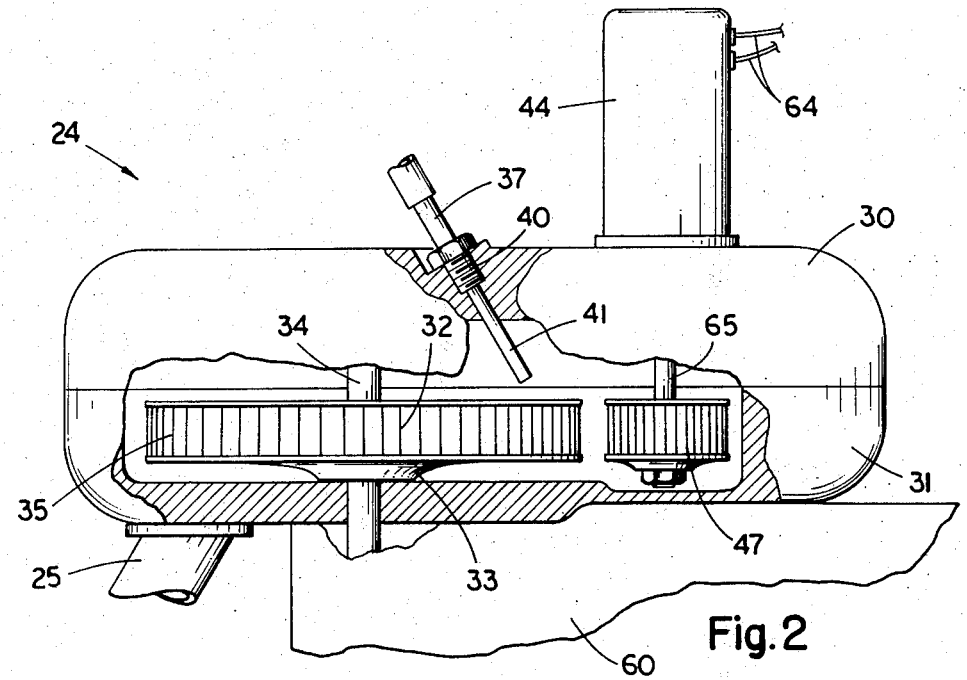
FIG. 2 is an enlarged fragmentary bottom view of the turbine shown in FIG. 1.
Figure 3:
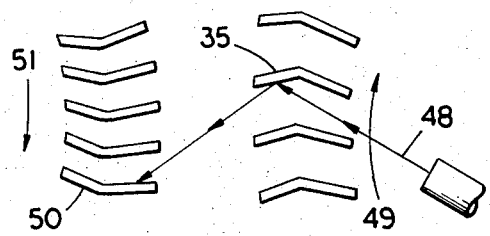
FIG. 3 is a schematic representation of the concave fins of the main turbine as related to the concave fins of one of the generators.
Figure 4:
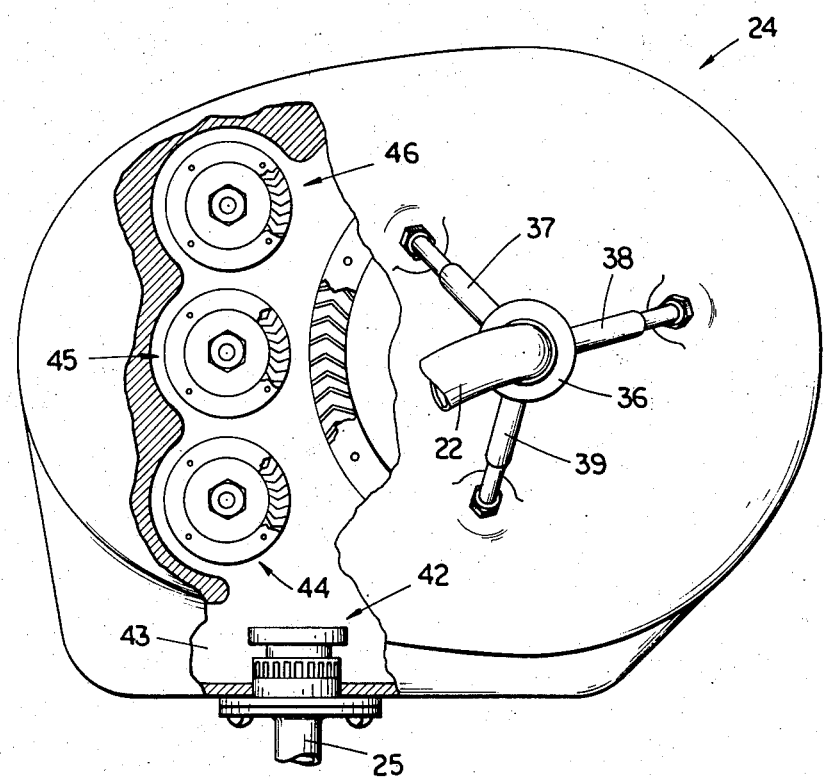
FIG. 4 is an enlarged fragmentary side view of an alternate embodiment of the turbine of FIG. 2.

Means are mounted to housing 24 for recharging the source of electrical energy 16. In the embodiment shown in FIG. 4, three generators 44, 45 and 46 are mounted on portion 30 of housing 24. For example, generator 44 (FIG. 2) is mounted to portion 30 and is electrically connected via wiring 64 to the electrical source of energy. Generator 44 has a rotatable shaft 65 with a turbine wheel 47 fixedly mounted thereto. Turbine wheel 47 is positioned immediately adjacent turbine wheel 32 to receive the unexpended thrust from the liquid extending through fins 35. As the pressurized liquid exits the three nozzles, the liquid continues to pass through the concave fins 35 eventually impinging upon the concave fins of each generator turbine. As shown in FIG. 3, liquid exits a nozzle in the direction of arrow 48 impinging upon the concave fins 35 of the main turbine wheel 32 thereby causing turbine wheel 32 to rotate in the direction of arrow 49. The liquid continues past through the concave fins 35 thereby changing the direction of the fluid so that the fluid impinges eventually upon concave fins 50 of turbine wheels 44 through 46 thereby causing the turbine wheels of generators 44 through 46 to rotate in the direction 51 which is opposite of direction 49.

The nozzles connected to conduits 37 through 39 are spaced equally around the axis of rotation of turbine wheel 32 with each nozzle directing the pressurized liquid outwardly against concave fins 35. Turbine wheel 32 has a diameter greater than one foot with the base and fins of the wheel having a sufficient mass to provide a moment of inertia to resist deceleration of turbine 32. As turbine 32 rotates, the pressurized liquid is forced outwardly by centrifugal force thereby increasing the impact of the pressurized liquid upon the concave fins of generators 44 through 46. The turbine wheels of the generators are therefore caused to rotate by capturing the unexpended thrust of the pressurized liquid as well as capturing the force resulting from the centrifugal action of the liquid from turbine 32. The electricity generated by generators 44 through 46 is then used for recharging the batteries within source 16. Appropriate gearing may be necessary to achieve the required rotation of the generator input shafts.

The concave fins of generators 44 through 46 have lengths which are not greater than the fixed lengths of the fins of turbine wheel 32. All fins extend lengthwise in the same direction. In the embodiment shown in the drawings, the rear wheels 14 and 15 are drivingly coupled via shafts 62 and 63 to transmission 61 which in turn is connected via gear box 60 (FIG. 1) to the main turbine wheel 32.

It will be obvious from the above description that the power system disclosed herein is adaptable for the propulsion of any stationary tool or vehicle for travel over land, in the air or under water, both forwardly and in reverse. Likewise, gearbox 60 is provided with suitable controls to provide for the forward or reverse movement of wheels 14 and 15.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. For example, the embodiment shown in FIGS. 1 through 3 is identical to the embodiment shown in FIG. 4 with the exception that the embodiment of FIG. 4 drains through the side wall of the housing with a sump pump 42 provided in space 43 being connected to conduit 25.

The invention claimed is:

1. In a vehicle having at least one rotatable driver for propelling the vehicle, a source of electrical energy mounted on said vehicle, a motor mounted on said vehicle and operably connected to said source of electrical energy, a liquid pump mounted on said vehicle and operably connected to said motor, a liquid system mounted on said vehicle and including a source of liquid connected to said pump and a nozzle for said liquid to exit under force from said pump, a turbine including a housing mounted to said vehicle and a first multi-vane wheel rotatably mounted within said housing for receiving said liquid from said nozzle, wherein the improvement comprises:

means mounted to said vehicle including a second multi-vane wheel rotatably mounted in said housing and positioned to receive and be rotated by liquid exiting said first multi-vane wheel, said means operable upon rotation of said second multi-vane wheel to utilize unexpended thrust of said liquid to recharge said source of electrical energy.

2. In a vehicle of claim 1 wherein:

said means includes a generator and said source of electrical energy includes at least one battery rechargeable by said generator.

3. In the vehicle of claim 2 wherein:

said vehicle includes a plurality of supporting wheels at least two of which include drive shafts coupled to said turbine.

4. In the vehicle of claim 3 and further comprising:

a plurality of generators mounted to said housing of said turbine, each of said generators including a rotatably mounted multi-vane wheel located peripherally adjacent said first multi-vane wheel to receive unexpended liquid thrust therefrom.

5. In the vehicle of claim 4 wherein:

said first multi-vane wheel includes a plurality of concave first fins, said multi-vane wheels of said generators each include a plurality of concave second fins, said multi-vane wheels of said generators rotate in a direction opposite of said first multi-vane wheel.

6. In the vehicle of claim 5 wherein:

said first multi-vane wheel includes a base rotatably mounted in said housing, said base has a circumferentially extending edge portion upon which said concave first fins are mounted and extend a fixed length, said nozzle extends adjacent said base and directs liquid outwardly against said concave first fins,
said concave second fins have lengths not greater than said fixed length of said concave first fins and extend in a direction lengthwise with said concave first fins.
7. The vehicle of claim 6 and further comprising:
a plurality of nozzles connected to said source of liquid supply being spaced equally around said first multi-vane wheel each being directed outwardly to direct pressurized liquid against said concave first fins.
8. In the vehicle of claim 7 wherein:
said first multi-vane wheel has a diameter greater than one foot with said base and said concave first fins having sufficient mass to provide a moment of inertia to resist deceleration of said first multi-vane wheel.
9. In the vehicle of claim 8 and further comprising:

a sump pump mounted to said housing and receiving said liquid after said liquid has been forced through said concave first fins and said concave second fins, said sump pump returning said liquid back to said source of liquid supply.

* * * * *